United States Patent [19]

Heimnick et al.

[11] Patent Number: 4,619,478
[45] Date of Patent: Oct. 28, 1986

[54] POWERED ADJUSTABLE ARM REST

[75] Inventors: Paul Heimnick, Owosso; LeRoy B. Johnson, Perry, both of Mich.

[73] Assignee: Schmelzer Corporation, Flint, Mich.

[21] Appl. No.: 769,265

[22] Filed: Aug. 26, 1985

Related U.S. Application Data

[63] Continuation-in-part of Ser. No. 572,660, Jan. 20, 1984.

[51] Int. Cl.⁴ .............................................. B60J 9/00
[52] U.S. Cl. ..................................... 296/153; 297/411
[58] Field of Search ................ 296/153, 65 A, 65 R, 296/71; 297/412, 411, 417; 248/118

[56]  References Cited
U.S. PATENT DOCUMENTS

| | | |
|---|---|---|
| 1,742,447 | 1/1930 | McKeag . |
| 1,892,048 | 12/1932 | Genung . |
| 1,970,816 | 8/1934 | Perky . |
| 2,324,292 | 7/1943 | Westrope . |
| 2,837,931 | 6/1958 | Brundage ........................ 296/65 R |
| 2,897,000 | 7/1959 | Hart et al. . |
| 3,038,757 | 6/1962 | Schulze . |
| 4,244,623 | 1/1981 | Hall et al. ...................... 297/411 X |

FOREIGN PATENT DOCUMENTS

| | | |
|---|---|---|
| 559424 | 10/1957 | Belgium ............................. 297/411 |
| 1755341 | 8/1971 | Fed. Rep. of Germany . |
| 2253819 | 5/1974 | Fed. Rep. of Germany . |
| 2807023 | 8/1978 | Fed. Rep. of Germany . |
| 1016138 | 11/1952 | France . |
| 57-60931 | 4/1982 | Japan . |
| 8101203 | 10/1982 | Netherlands . |

Primary Examiner—Robert B. Reeves
Assistant Examiner—Russell D. Stormer
Attorney, Agent, or Firm—Harness, Dickey & Pierce

[57] ABSTRACT

A power adjustable arm rest assembly is disclosed wherein the angular altitude or pitch, as well as the vertical height, of a movable arm rest portion are adjustable independently of one another in order to maximize user comfort. The mechanisms for independently adjusting the angular and vertical positions include powered actuating devices near either end of the movable arm rest portion that are connected to a fixed mounting member in order to accommodate angular adjustment. The actuating devices further include extendible and retractable armature members pivotally interconnected to the movable arm rest portion and are energizable and deenergizable in order to respectively urge the movable arm rest portion to, or hold the movable arm rest portion in, preselected adjusted positions.

20 Claims, 5 Drawing Figures

POWERED ADJUSTABLE ARM REST

BACKGROUND AND SUMMARY OF THE INVENTION

This is a continuation-in-part of a copending U.S. patent application Ser. No. 572,660, filed Jan. 20, 1984, entitled ADJUSTABLE ARM REST, the disclosure of which is hereby incorporated by reference; and of a copending U.S. patent application, Ser. No. 769,266 ADJUSTABLE ARM REST AND CONSOLE ASSEMBLY, naming LeRoy B. Johnson as inventor, and filed of even date herewith, the disclosure of which is also hereby incorporated by reference.

The invention relates generally to an adjustable arm rest assembly primarily adapted to be positioned adjacent an occupant seat or the like in a land or marine vehicle or in an aircraft. More specifically, the invention relates to an adjustable arm rest assembly that is adapted to be installed on a relatively fixed structure of the vehicle or the like, and that includes power-actuated adjusting mechanisms for adjustably altering both the angular attitude (pitch) and the vertical height of the arm rest assembly independently of one another.

Various arm rest assemblies or similar structures have been provided for mounting or otherwise being positioned adjacent an occupant seat structure or the like in a land or marine vehicle or in an aircraft. Many of such prior asemblies have been adapted for mounting on a door panel or other generally vertical structure in the vehicle or aircraft. Some of these prior arm rest assemblies have been provided with an adjustability feature in order to suit the user's comfort. However, many of such assemblies have been provided with adjustability mechanisms for adjusting only the angular attitude, or only the height, of the arm rest assembly, but have not had the capability of adjusting either the anuglar pitch, the height, or both, independently of one another. Furthermore, many of such prior adjustable arm rest assemblies have not been equipped with power-actuated adjusting mechanisms. In addition, many of the arm rest assemblies of the prior art have been found to be relatively expensive and complex to manufacture or install, to be relatively inconvenient to use, to be relative heavy in weight, or to require frequent and expensive maintenance in order to keep them in good operating order.

It is a general object of the present invention to provide an adjustable arm rest and console assembly, wherein both the angular attitude or pitch, as well as the height, of the arm rest portion of the assembly are adjustable independently of one another in order to maximize user comfort.

Another objective of the present invention is to provide such an independently adjustable arm rest assembly that is power-actuated, either by electrical, pneumatic or hydraulic power.

Still another objective of the present invention is to provide such an independently adjustable arm rest assembly that is inexpensive to manufacture and install, that is simple and convenient to operate, that uses relatively simple and durable components, thereby minimizing the maintenance requirements of the assembly in providing for long life, and that is relatively lightweight in order to contribute to the fuel economy of a vehicle including an arm rest assembly according to the present invention.

According to one aspect of the present invention, a power-operated adjustable arm rest assembly is adapted to be adjustably mounted on a relatively fixed structure, such as a generally vertically-extending interior panel of a vehicle or the like. The arm rest assembly includes a generally longitudinally-extending arm rest structure, a mounting member adapted to be fixedly secured to the fixed structure of the vehicle, or other apparatus in which it is to be installed for, adjustably mounting the arm rest astructure thereon. A support mechanism is provided for interconnecting the arm rest structure with the mounting means for both pivotal and generally translational adjustable movement of the arm rest structure relative to the mounting means in a reference plane generally parallel to the interior panel of the vehicle or the like. The assembly also includes at least a pair of selectively actuable powered adjustment mechanisms longitudinally spaced apart on opposite sides of the support member. The powered adjustment mechanisms interconnect the arm rest structure with the mounting member and selectively urge the arm rest structure to, and hold the arm rest structure in, a preselected adjusted position relative to the mounting member. The adjustment mechanisms are selectively actuable or energizable independtly of one another in order to allow both the pivotal and translational positions of the arm rest structure to be adjusted either independently of one another or in conjunction with one another.

In a preferred embodiment of the present invention, the mounting member includes an opening extending therethrough in a direction generally parallel to the above-mentioned reference plane. The support member is slidably received for movement in the opening in the mounting member and with the arm rest structure is pivotally interconnected with the support member for both pivotal and translational movement therewith relative to the mounting member. Preferably, the actuating mechanisms are pivotally interconnected with the mounting member for limited pivotal movement and for limited longitudinal movement relative thereto in order to facilitate independent operation of the actuating mechanisms and thus allowing for independent adjustment of the angular and translational positions of the arm rest structure.

Additional objects, advantages and features of the present invention will become apparent from the following description and appended claims, taken in conjunction with the accompanying drawings.

DETAILED DESCRIPTION OF THE PREFERRED EMBODIMENTS

Figure 1:
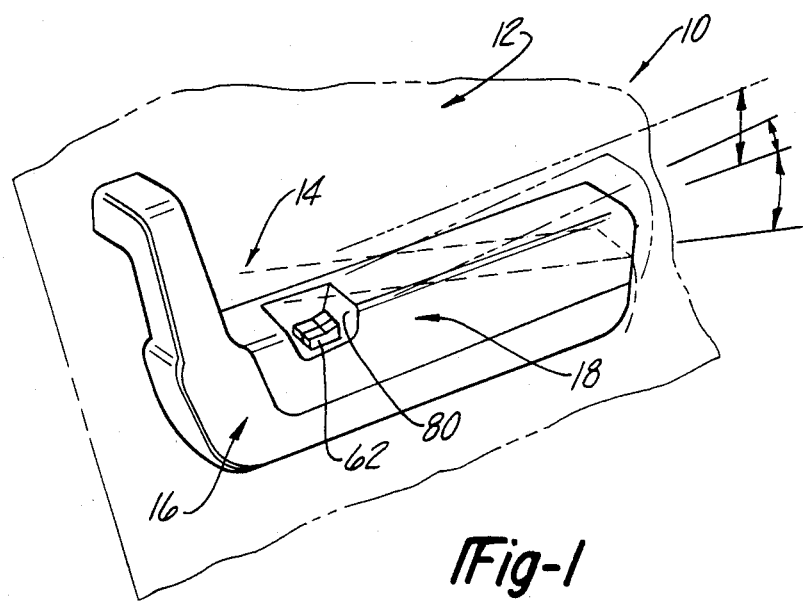
FIG. 1 is a partial perspective view of the interior of a vehicle or aircraft, or the like, illustrating a power-operated adjustable arm rest assembly according to the present invention installed on a generally vertically-extending interior panel.

FIGS. 1 through 5 of the drawings illustrate a preferred exemplary embodiment of a power-operated adjustable arm rest assembly, according to the present invention, adapted for installation on a generally vertically-extending, relatively fixed panel portion of the interior of a vehicle or aircraft. One skilled in the art will readily recognize from the following discussion, however, that the principles of the invention are equally applicable to an adjustable arm rest assembly that is adapted for installation in applications other than the particular vehicular application illustration in the drawings, including stationary applications, or that varies from the particular structural configuration shown for purposes of exemplary illustration in the drawings.

In FIG. 1, a vehicle interior 10 generally includes a fixed interior panel 12 extending generally vertically therein, and a power-operated adjustable arm rest assembly 14, according to the present invention, mounted on the interior panel 12. The arm rest assembly 14 generally includes a fixed arm rest portion 16, which is secured to the interior panel 12, and a generally longitudinally-extending, movable arm rest structure 18. Substantial portions of these components are preferably composed of light-weight synthetic materials.

Figure 2:
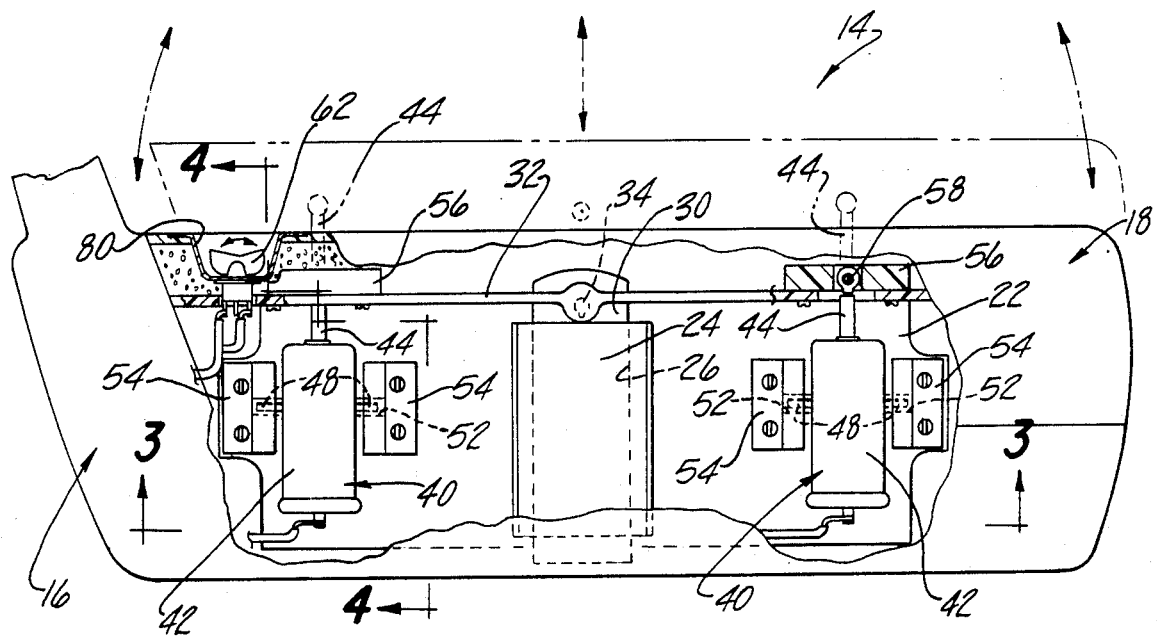
FIG. 2 is a side elevational view of the adjustable arm rest assembly of FIG. 1, with some exterior portions broken away to reveal interior components of the adjustment mechanisms.
Figure 3:
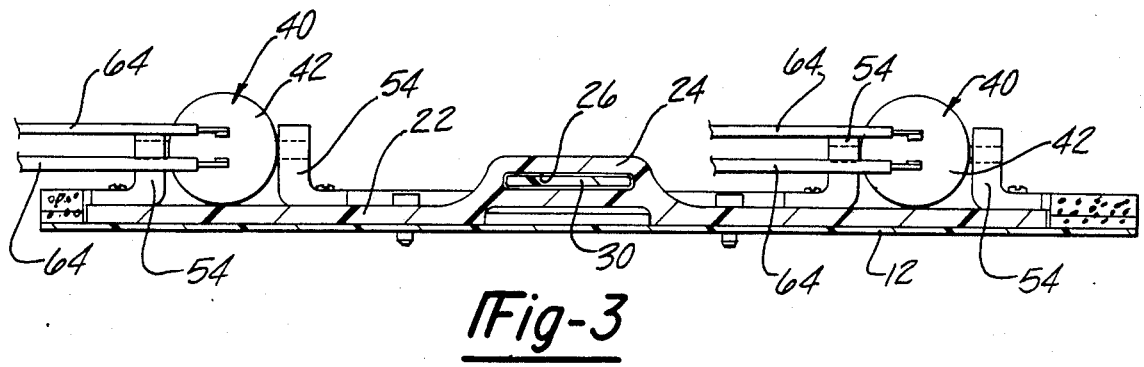
FIG. 3 is a partial cross-sectional view taken generally along line 3—3 of FIG. 2.
Figure 4:
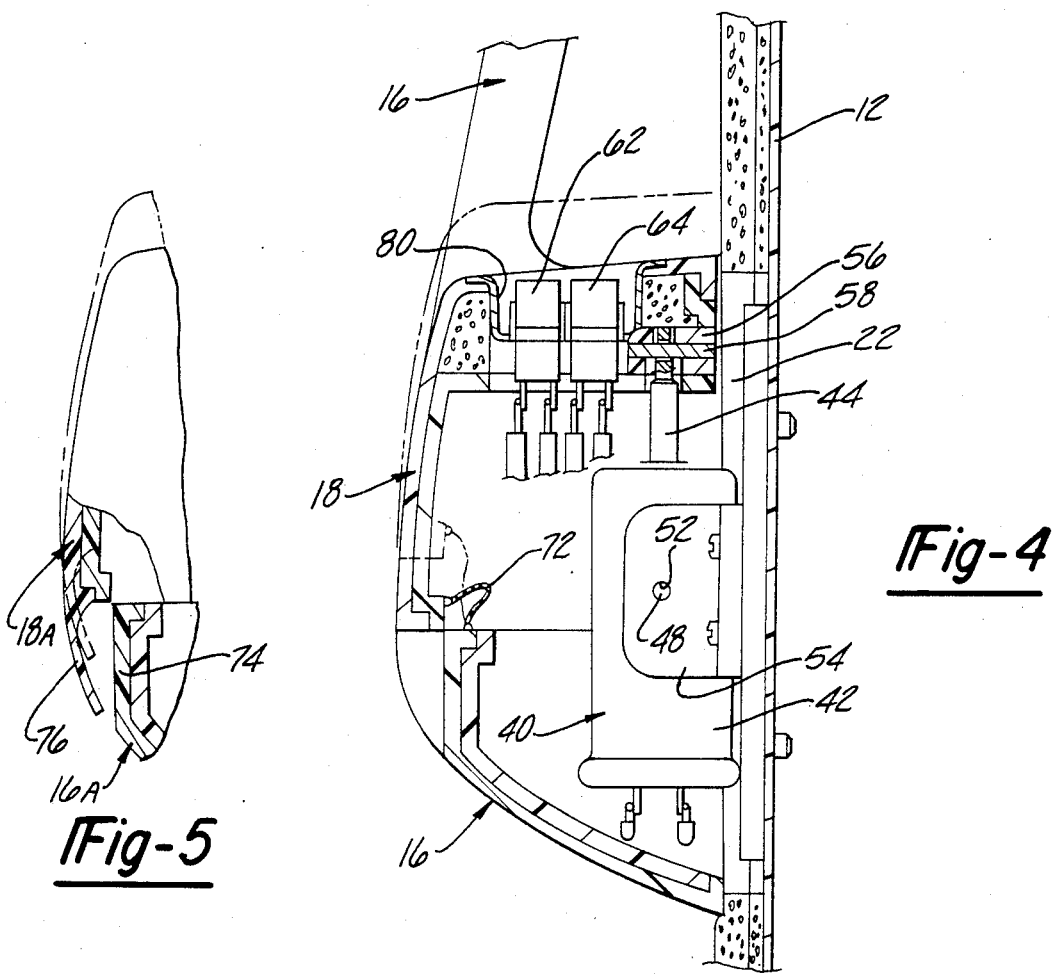
FIG. 4 is a partial cross-sectional view taken generally along line 4—4 of FIG. 2.

As shown in FIGS. 2 through 4, the preferred arm rest assembly 14 includes a mounting member 22 adapted to be fixedly secured to the interior panel 12 for adjustably mounting the movable arm rest structure 18 thereon. The mounting member 22 includes a laterally enlarged portion 24 that is spaced laterally outwardly from the interior panel 12, as shown in FIG. 3, and which includes a socket opening 26 extending generally vertically therethrough. A support member 30 is slidably received in the opening 26 for generally vertical movement therein. The support member 30 is pivotally interconnected with a frame portion 32 of the arm rest structure 18, by a generally laterally-extending pivot member 34, in order to facilitate angular adjustment of the arm rest structure 18, while still carrying a large portion of the loads on the arm rest structure, which is cantilevered laterally outwardly.

A pair of selectively operable power actuators 40 are longitudinally spaced apart on opposite sides of the laterally enlarged portion 24 of the mounting member 22 and the support member 30. Each of the power actuators 40 includes a housing 42, as well as an armature 44 that is extendible and retractable in generally vertical directions in order to urge the arm rest structure 18 to, or to hold the arm rest structure 18 in, preselected adjusted positions as described more fully below.

The housings 42 of the power actuators 40 are preferably pivotally and longitudinally slidably interconnected with the mounting member 22 by pivot pins 48 extending generally longitudinally through openings 52 in associated adjacent bracket members 54, which are in turn fixedly secured to the mounting member 22. By such an interconnection with the mounting member 22, the power actuators are vertically anchored at a relatively fixed location relative to the mounting member 22, but can slidably move slightly in longitudinal directions, and can pivot slightly lateral directions, in order to accommodate the angular movement of the movable arm rest structure 18 relative to the fixed arm rest portion 16, without binding, when the power actuators 40 are independently operated or energized in order to accomplish angular adjustments.

The armatures 44 are pivotally interconnected with a corresponding number of connecting members 56, which are fixedly secured to the frame portion 32 of the arm rest structure 18, by generally laterally-extending pivot pins 58. By such interconnection between the armatures 44 and the arm rest structure 18, the arm rest structure 18 is allowed to pivot relative to the armatures 44 in a plane generally parallel to the interior panel 12 such that when the power actuators 40 are energized (as discussed below) the armatures 44 urge the arm rest structure 18 in generally vertical directions upwardly and downwardly, independently at both longitudinal ends of the arm rest structure 18, in order to independently adjust its angular and elevational position relative to the interior panel 12.

The power actuators 40 are preferably electrically actuated solenoid devices, to which electrical power from a power source (not shown) is supplied through a corresponding number of adjacently situated control switches 62 and through electrical conductors 64. The control switches 62 are relatively conventional and well-known rocker-type switches, and can be operated either simultaneously or separately and independently. The control switches 62 are wired to energize the power actuators 40 to extend the armatures 44 upwardly away from the housings 42 in response to rocking movement of the control switches 62 in a first direction, to energize the power actuators 40 to retract the armatures 44 when the control switches 62 are rocked or moved to an opposite position, and to deenergize the power actuators 40 when the control switches 62 are in an intermediate position. Thus, by moving either or both of the control switches 62 to their first or second positions discussed above, the user can energize the power actuators 40 to selectively extend or retract the armatures 40, thereby causing adjustment of either the angular attitude or pitch of the arm rest structure 18, the vertical elevational position of the arm rest structure 18, independently or simultaneously in order to suit the user's comfort. It should be noted that although the preferred electrical actuation system discussed above is shown in the drawings, the electrical power actuators 40 can optionally be interchanged with either hydraulically operated actuating devices or pneumatically operated actuating devices, such as those well-known to those skilled in the art.

Figure 5:
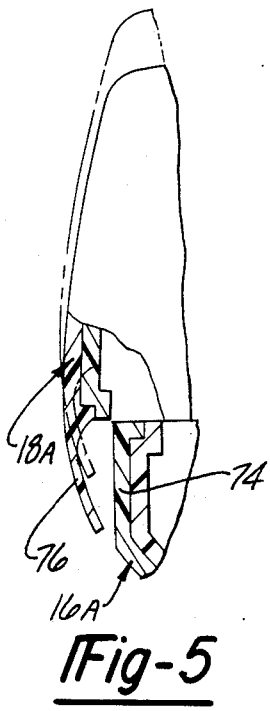
FIG. 5 is a partial cross-sectional view of a portion of an adjustable arm rest according to the present invention, but illustrating an alternate configuration thereof.

As shown in FIG. 4, the fixed arm rest portion 26 and the movable arm rest structure 18 can be optionally interconnected by a flexible boot member 72 at their laterally-outward edges in order to cover and protect the internal components of the adjustable arm rest assembly 14. Alternately, however, as shown in FIG. 5, the laterally outward edges 74 and 76 of the alternate fixed arm rest portion 16A and the alternate movable arm rest structure 18A, respectively, can extend vertically in an overlapping and telescopically arranged configurationo in lieu of the flexible boot member 72 shown in FIG. 4. Also, it should be noted that a recessed portion 80 is preferably provided in the arm rest structure 18 (or 18A) in order to house the control switches 62 such that they are protected from being inadvertently operated to inadvertently alter the preselected adjusted position of the movable arm rest structure 18 (or 18A) relative to the interior panel 12.

Because the arm rest structure 18 is cantilevered laterally outwardly relative to the interior panel 12, the loads imposed on the arm rest structure 18 during use create a reactive force on the support member 30 in a laterally outward direction, which is resisted by the laterally enlarged portion 24 of the mounting member 22. Thus regardless of the adjusted position of the arm rest structure 18, the majority of the loads imposed on the arm rest structure 18 during use are supported by the mounting member 22, through the interconnection with the support member 30. As a result the power actuators 40 are not required to support a large amount of these loads.

The foregoing discussion discloses and describes exemplary embodiments of the present invention. One skilled in the art will readily recognize from such discussion that various changes, modifications and variations may be made therein without departing from the spirit and scope of the invention as defined in the following claims.

We claim:

1. A power-operated adjustable arm rest assembly adapted to be adjustably mounted on a relatively fixed structure for adjustment along a generally vertical plane, said arm rest assembly comprising:

a generally longitudinally-extending arm rest structure;

mounting means adapted to be fixedly secured to said fixed structure for mounting said arm rest structure thereon, said mounting means having an opening extending therethrough in a generally vertical direction;

support means for interconnecting said arm rest structure with said mounting means for both pivotal and generally translational adjustable movement relative to said mounting means in said generally vertical plane, said support means including a generally vertically-extending elongated support member vertically slidably received in said opening in said mounting means and pivotally interconnected with said arm rest structure for pivotal relative movement in said generally vertical plane;

a pair of selectively actuable powered actuating means longitudinally spaced apart on opposite sides of said support means and interconnecting said arm rest structure and said mounting means for selectively urging said arm rest structure to, and for holding said arm rest structure in, preselected adjusted positions relative to said mounting means, said holding means being selectively actuable independently of one another to perform said urging and holding functions in order to allow both the pivotal and translational positions of said arm rest structure relative to said fixed structure to be adjusted independently.

2. A power-operated adjustable arm rest assembly according to claim 1, wherein said actuating means each include a housing member attached to said mounting means, and a power-actuable armature member extendible and retractable relative to said housing member, said armature member being pivotally attached to said arm rest structure for limited pivotal relative movement generally in a plane parallel to said first plane.

3. A power-operated adjustable arm rest assembly according to claim 2, wherein each of said actuating means comprises an electrically powered actuating device.

4. A power-operated adjustable arm rest assembly according to claim 2, wherein each of said actuating means comprises a hydraulically powered actuating device.

5. A power-operated adjustable arm rest assembly according to claim 2, wherein each of said actuating means comprises a pneumatically powered actuating device.

6. A power-operated adjustable arm rest assembly according to claim 1, wherein said opening in said mounting means is laterally spaced apart from said fixed structure in a direction generally toward said arm rest structure.

7. A power-operated adjustable arm rest assembly adapted to be adjustably mounted on a relatively fixed structure, said arm rest assembly comprising:

a generally longitudinally-extending arm rest structure;

mounting means adapted to be fixedly secured to said fixed structure for mounting said arm rest structure thereon, said mounting means having an opening extending therethrough in a direction generally parallel to said first plane and laterally spaced apart from said fixed structure in a direction generally toward said arm rest structure;

support means for interconnecting said arm rest structure with said mounting means for both pivotal and generally translational adjustable movement relative to said mounting means in a first plane, said support means including an elongated support member slidably received for movement in said opening, said arm rest structure being pivotally interconnected with said support member for both pivotal and translational movement relative to said mounting means in a plane generally parallel to said first plane; and a pair of selectively actuable powered actuating means longitudinally spaced apart on opposite sides of said support means and interconnecting said arm rest structure and said mounting means for selectively urging said arm rest structure to, and for holding said arm rest structure in, preselected adjusted positions relative to said mounting means, said holding means being selectively actuable independently of one another to perform said urging and holding functions in order to allow both the pivotal and translational positions of said arm rest structure relative to said fixed structure to be adjusted independently, each of said actuating means including a first portion pivotally interconnected with said mounting means for limited lateral pivotal movement relative thereto at a substantially fixed location thereon, and a second portion selectively extendible and retractable relative to said first portion in directions generally parallel to said first plane, said second portion of said actuating means being pivotally interconnected with said arm rest structure for limited relative pivotal movement therebetween in a plane generally parallel to said first plane.

8. A power-operated adjustable arm rest assembly adapted to be adjustably mounted on a relatively fixed vertically-extending structure, said arm rest assembly comprising:

a generally longitudinally-extending movable arm rest structure;

a mounting member adapted to be fixedly secured to said fixed vertical structure for mounting said arm rest structure thereon, said mounting member having a laterally enlarged portion with a generally vertical opening extending therethrough in a direction generally parallel to said fixed vertical structure and spaced laterally therefrom;

a generally vertically elongated support member slidably received for generally vertical movement in said vertical opening in said mounting member, said support member being pivotally interconnected with said arm rest structure for relative pivotal movement therebetween in a plane generally parallel to and laterally spaced from said fixed vertical structure;

a pair of powered actuating means longitudinally spaced apart on opposite sides of said support member, each of said actuating means having a housing portion interconnected with said mounting member at a substantially fixed location thereon and an armature selectively extendible and retractable in generally vertical directions toward and away from said housing when said actuating means is energized, each of said armatures being pivotally interconnected with said arm rest structure for limited relative pivotal movement therebetween generally in a plane parallel to said fixed vertical structure and for urging said arm rest structure in said generally vertical directions toward and away from said housing in order to adjust the position of said arm rest structure relative to said fixed vertical structure; and means for selectively and independently energizing said powered actuating means in order to selectively and independently extend and retract said armatures and to thereby selectively adjust both the angular position and the vertical elevational position of said arm rest structure relative to said fixed vertical structure, said armature holding said arm rest structure in a preselected adjusted position when said actuating means are deenergized.

9. A power-operated adjustable arm rest assembly according to claim 8, wherein each of said powered actuating means comprises an electrically powered actuating device.

10. A power-operated adjustable arm rest assembly according to claim 8, wherein each of said powered actuating means comprises a hydraulically powered actuating device.

11. A power-operated adjustable arm rest assembly according to claim 8, wherein each of said powered actuating means comprises a pneumatically powered actuating device.

12. A power-operated adjustable arm rest assembly according to claim 8, wherein said arm rest assembly further comprises a fixed arm rest portion fixedly interconnected with said fixed vertical structure, said movable arm rest structure being pivotally and translationally movable toward and away from said fixed arm rest portion.

13. A power-operated adjustable arm rest assembly according to claim 12, wherein said movable arm rest structure and said fixed arm rest portion are interconnected by a flexible boot member.

14. A power-operated adjustable arm rest assembly according to claim 12, wherein said movable arm rest structure and said fixed arm rest portion are in part telescopically movable relative to one another.

15. A power-operated adjustable arm rest assembly according to claim 8, further comprising bracket means fixedly attached to said mounting member generally adjacent each of said powered actuating means, said powered actuating means being pivotally interconnected with their respective adjacent bracket means for limited pivotal movement relative thereto in generally lateral directions.

16. A power-operated adjustable arm rest assembly according to claim 15, wherein said powered actuating means are each also sidably interconnected with their respective adjacent bracket means for limited longitudinal movement relative thereto.

17. A power-operated adjustable arm rest assembly adapted to be adjustably mounted on a relatively fixed vertically-extending structure in a vehicle or the like, said arm rest assembly comprising:

a generally longitudinally-extending movable arm rest structure;

a mounting member adapted to be fixedly secured to said fixed vertical structure for mounting said arm rest structure thereon, said mounting member having a laterally enlarged portion with a generally vertical opening extending therethrough in a direction generally parallel to said fixed vertical structure and spaced laterally therefrom, and at least a pair of bracket members longitudinally spaced apart on opposite sides of said laterally enlarged portion and fixedly secured to said mounting member;

a generally vertically elongated support member slidably received for generally vertical movement in said opening in said mounting member, said support member being pivotally interconnected with said arm rest structure for relative pivotal movement therebetween in a plane generally parallel to and laterally spaced from said fixed vertical structure;

a pair of electrically powered actuating means longitudinally spaced apart on opposite sides of said support member, each of said actuating means having a housing portion pivotally interconnected with at least one of said bracket members for limited pivotal movement relative thereto and for limited longitudinal movement relative thereto, and an armature selectively extendible and retractable in generally vertical directions toward and away from said housing, each of said armatures being pivotally interconnected with said arm rest structure for limited relative pivotal movement therebetween generally in a plane parallel to said fixed vertical structure and for urging said arm rest structure in said generally vertical directions toward and away from said housing in order to adjust the vertical and angular positions of said arm rest structure relative to said fixed vertical structure; and means for selectively and independently energizing said electrically powered actuating means in order to selectively and independently extend and retract said armatures and to thereby selectively adjust both the angular position and the vertical elevational position of said arm rest structure relative to said fixed vertical structure independently, said armatures holding said arm rest structure in a preselected adjusted position when said electrically powered actuating means are deenerigized.

18. A power-operated adjustable arm rest assembly according to claim 17, wherein said arm rest assembly further comprises a fixed arm rest portion fixedly interconnected with said fixed vertical structure, said movable arm rest structure being pivotally and translationally movable toward and away from said fixed arm rest portion.

19. A power-operated adjustable arm rest assembly according to claim 18, wherein said movable arm rest structure and said fixed arm rest portion are interconnected by a flexible boot member.

20. A power-operated adjustable arm rest assembly acording to claim 18, wherein said movable arm rest structure and said fixed arm rest portion are in part telescopically movable relative to one another.

* * * * *

UNITED STATES PATENT AND TRADEMARK OFFICE
CERTIFICATE OF CORRECTION

PATENT NO. : 4,619,478

DATED : October 28, 1986

INVENTOR(S) : Paul Heimnick

It is certified that error appears in the above-identified patent and that said Letters Patent is hereby corrected as shown below:

Col. 1, line 56:

In the "References Cited" the following have been omitted:

3,642,088    2/15/72    Smith
        4,097,088    6/27/78    Meiller
        4,311,338    1/19/82    Moorhouse
        4,496,190    1/29/85    Barley Col. 1, Line 37, Page 1, Line 25    "anuglar" should be —angular—

Col. 2, Line 8, Page 2, Line 29    "astructure" should be —structure—

Col. 2, Line 24, Page 3, Line 11    "independtly" should be —independently—

Col. 4, Line 59, Page 7, Line 26    "configurationo" should be —configuration—

UNITED STATES PATENT AND TRADEMARK OFFICE
CERTIFICATE OF CORRECTION

PATENT NO. : 4,619,478

DATED : October 28, 1986

INVENTOR(S) : Paul Heimnick

It is certified that error appears in the above-identified patent and that said Letters Patent is hereby corrected as shown below:

Col. 10, Line 4, Claim 20, "acording" should be --according--

Signed and Sealed this

Eleventh Day of August, 1987

Attest:

DONALD J. QUIGG

*Attesting Officer*  *Commissioner of Patents and Trademarks*